United States Patent [19]

Kramer

[11] Patent Number: 4,500,248

[45] Date of Patent: Feb. 19, 1985

[54] TRUCK WITH EXCHANGEABLE LOAD CARRIER

[75] Inventor: Thomas Kramer, Krefeld, Fed. Rep. of Germany

[73] Assignee: The Coca-Cola Company, Atlanta, Ga.

[21] Appl. No.: 316,360

[22] Filed: Oct. 29, 1981

[30] Foreign Application Priority Data

Nov. 8, 1980 [DE] Fed. Rep. of Germany ....... 3042228
Aug. 14, 1981 [DE] Fed. Rep. of Germany ....... 3132165

[51] Int. Cl.³ .............................................. B60P 1/64
[52] U.S. Cl. ................................... 414/459; 414/351; 414/461; 414/498
[58] Field of Search ................ 414/458–461, 414/495, 498

[56] References Cited

U.S. PATENT DOCUMENTS 3,348,711 10/1967 Gove ................................. 414/459
3,369,682 2/1968 Breault ............................. 414/459
4,077,534 3/1978 Baaso ............................... 414/461

Primary Examiner—Robert G. Sheridan
Attorney, Agent, or Firm—Birch, Stewart, Kolasch & Birch

[57] ABSTRACT

To expedite loading and unloading of a truck, in particular of a beverage supply truck, the truck is provided with a load carrier which is received by a portal-like frame, surrounding the load carrier in the longitudinal direction of the vehicle and open at least at one side. Due to lifting elements, the load carrier can be lifted from the ground into the frame. If the load carrier is lowered to the ground, loading and unloading is facilitated. Moreover, the load carrier can be laterally removed from the frame on a roller conveyor.

3 Claims, 6 Drawing Figures

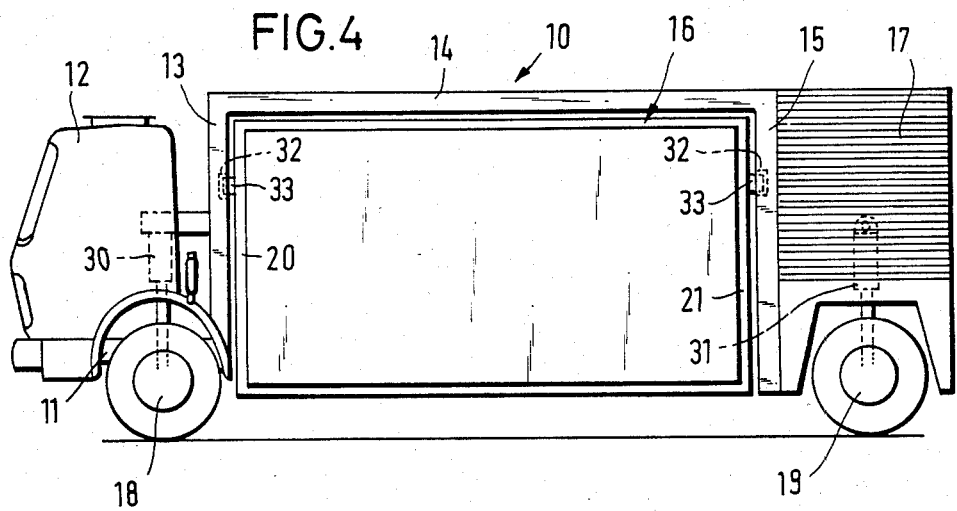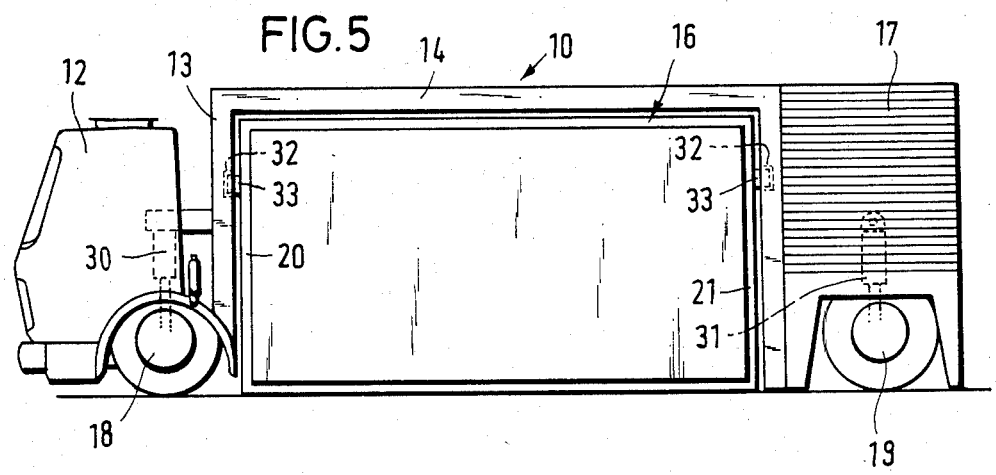

TRUCK WITH EXCHANGEABLE LOAD CARRIER

The invention relates to a truck with an exchangeable load carrier comprising a rigid frame and a lifting device to lift the load carrier from the bottom into a travel position as well as to lower it from there to the bottom.

The usual trucks with a loading surface in a high position can be loaded and unloaded but with difficulty. Moreover, during the loading operations, the vehicles are not available for other purposes, so that they cannot be used. To ensure a better utilization of trucks, container cars have been developed which comprise as a load carrier a container that is removed by a crane from the vehicle and can be replaced by another container.

While the containers ae loaded and unloaded, the vehicle may be on the road to transport, if necessary, other containers. The unloading and discharging of the container is performed either at specific stations by means of cranes or by a lifting device mounted at the vehicle. In the latter case, the lifter has to lift the container from the loading surface, to swing it out of the vehicle area and to finally locate it. This requires an involved swing system at the lifting device. It is not possible to handle heavy loads this way, because there is the risk for the vehicle to turn over.

It is the object of the invention to provide a truck of the type mentioned at the outset hereof, in which the load carrier can be lowered without swing movements and can be received again by the vehicle.

To solve this problem, according to the invention there is provided a frame which encloses the load carrier at three sides and is open in a downward direction.

As a result, the load carrier is suspended in the frame in which it is locked, of course, in a travel position so that a firm contact is ensured between the load carrier and the frame. When the load carrier is lowered, the locking is released to lower it to the bottom. It may then be moved out of the vehicle area. The advantage not only resides in the simple exchanging of the load carrier by an exclusively vertical movement, but also in the possible lowering to the bottom of the load carrier without the need of detaching it completely from the vehicle. Thus, removal of heavy loads from the load carrier is facilitated.

The load carrier may be a closed container, but it may also have a frame structure which is laterally open. In the latter case, the sides are fully accessible to loading and unloading operations. A vehicle comprising such a load carrier is particularly suitable as a delivery truck for drinks, for stacking cases of bottles or even entire palletized loads. In spite of the frame structure of the load carrier with open sides, it is possible, of course, to take care that the lateral dropping of the loads is avoided. The load carrier may be covered with a tarpaulin. If the truck is used for transporting drinks, the load carrier may be separately loaded at the delivery station, but the entire vehicle must not be left unused. If the load carrier is loaded, it is shifted beneath the frame of a vehicle, lifted by the vehicle and locking within it. If it is intended to remove individual parts of the load at a place of delivery, the load carrier may be lowered so that the load is accessible from the sides at a suitable height. Upon the removal of the individual parts of the load the load carrier may be lifted again to the travel height.

According to a preferred embodiment of the invention, the frame encloses the front and rear end side of the load carrier, the frame having at least one beam bridging the load carrier and being open to at least one side for the removal of the load carrier.

The load carrier may be moved out of the vehicle area by lateral displacement so that the vehicle may subsequently go on. This lateral displacement can be achieved for instance by means of rolls (100 of FIG. 1) mounted beneath the container or by a roller conveyor (102 of FIG. 2) over which the truck is driving, the longitudinal axis of the vehicle being in a transverse direction to the roller axes. In this case, the load carrier is lowered to the roller conveyor or to another cross conveying device to be moved laterally. Such a cross conveyor has to be present for drink delivering vehicles only for instance at the place of loading and at the end of the bulk purchasers, because only reduced partial loads are removed anyhow at the end of purchasers of small quantities, so that it would not be justifiable to detach the load carrier from the truck and to leave it as it is. However, it is advantageous that the load carrier can be lowered to facilitate unloading of partial loads.

The lifting device preferably consists of at least two lifting elements supported at the frame and engaging the load carrier. Lifting elements suitable for this purpose are e.g. piston-cylinder units, rack-and-pinion drives, screw spindle drives, cable lines etc.

According to a variant of the invention, the total frame together with the load carrier can be lifted and lowered. To achieve this effect, the lifting device consists of at least two lifting elements supported on the axles and engaging the frame. To retain the load carrier at the frame, the latter may be provided at its front sides with transverse slots into which, in a lowered condition of the frame and load carrier, the load carrier can be introduced by means of pins. A safe locking and suspension of the load carrier at the frame is possible due to this simple construction.

According to a preferred embodiment of the invention, the motor of the truck is mounted behind the load carrier on the rear axle, and supply and signal lines (104 of FIGS. 1–3) extend above the load carrier between the driver's cab at the front and the vehicle motor.

The retro-fitting of conventional trucks as produced in mass production into the invented truck equipped with a portal-type frame may possibly be expensive because the frame has a controlling influence on the basic construction of the entire vehicle. For this reason, the construction type preferred in this invention is the load carrier as part of a semitrailer to be used in connection with a truck tractor. Here, only the semitrailer must be equipped with a portal-type frame in accordance with the present invention. Such a semitrailer can be used in connection with a customary truck tractor.

BRIEF DESCRIPTION OF THE DRAWINGS

Embodiments of the invention are explained hereinafter more closely with reference to the Figures in the drawings, wherein like reference numerals refer to like parts:

FIG. 4 shows another embodiment of the truck of the present invention with the load frame in travel position;

FIG. 5 shows the truck of FIG. 4 with the load frame lowered and

DESCRIPTION OF PREFERRED EMBODIMENTS

Figure 1:
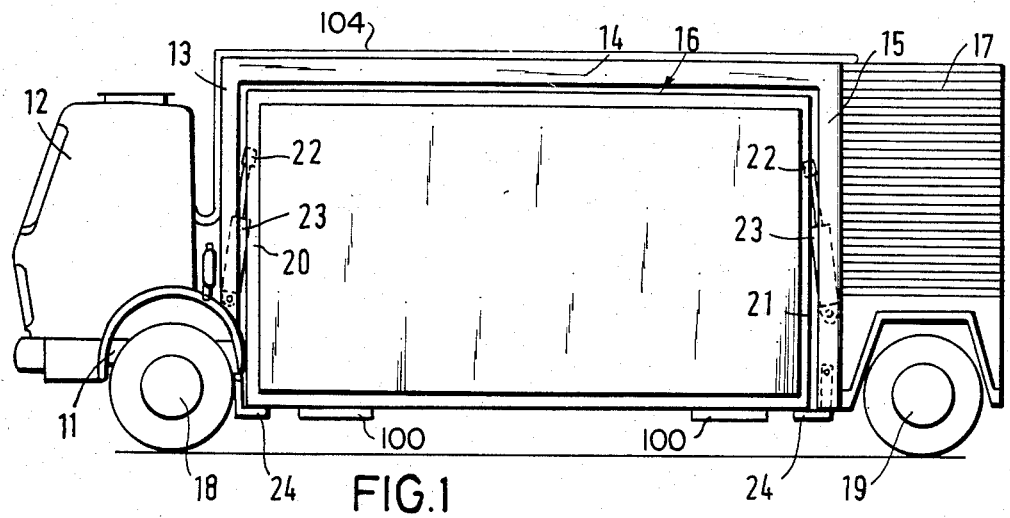
FIG. 1 is a schematic side view of a first embodiment of the truck with the load carrier lifted in travel position.
Figure 2:
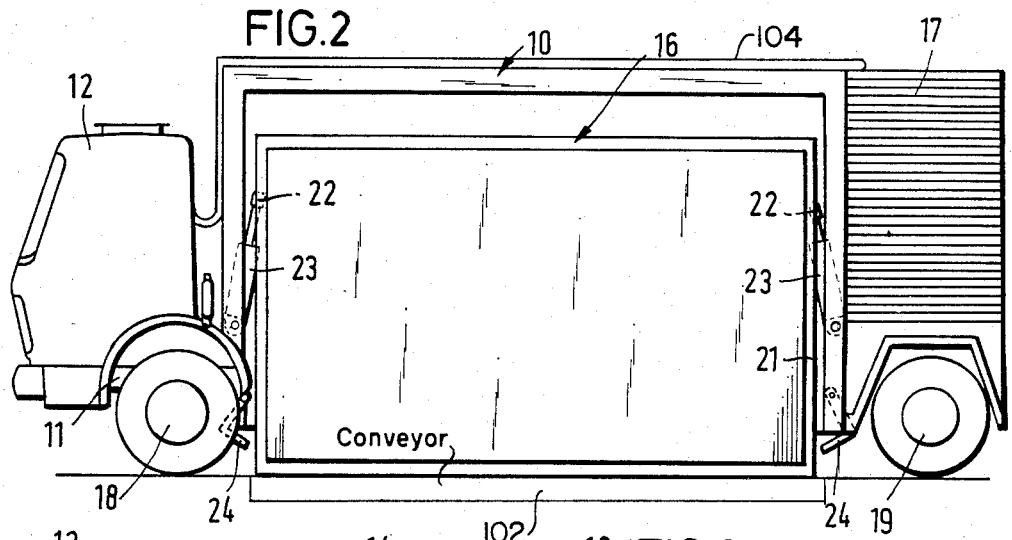
FIG. 2 shows the truck of FIG. 1 with the load carrier in lowered position.
Figure 3:
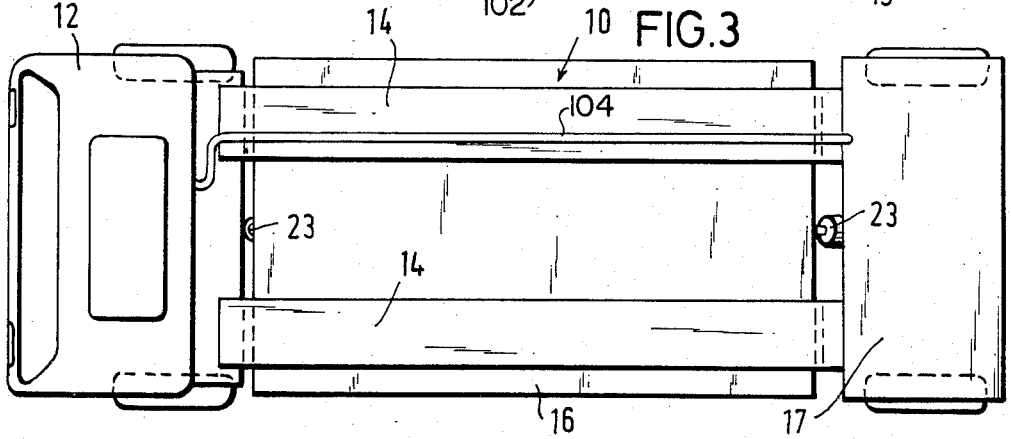
FIG. 3 is a plan view of the truck according to FIGS. 1 and 2.

The truck according to FIGS. 1 to 3 has a rigid frame 10 having mounted thereon the driver's cab 12 on its horizontal front end 11. A vertical support 13 is provided adjacent to the horizontal front end 11 of the frame 10 and is connected to the vertical rear support 15 via a horizontal beam 14. The supports 13 and 15 and the beam 14 form an inverse U-shaped frame construction open in a downward direction and bridging the load carrier 16-in the lateral view of the truck-over its total length. At the rear vertical support 15, the motor 17 is mounted. To avoid using a drive shaft extending over the total length of the vehicle, the latter is provided with a rear engine and with rear axle drive. The front axle 18 as well as the rear axle 19 are suspended at the frame 10 via spring and attenuation elements.

As evident from FIG. 3, two beams 14 (shown in plan view) are provided which extend in parallel relative to each other. It is possible to provide transverse or diagonal struts between said beams.

The box profile of the load carrier 16 is rectangular. Preferably, it is open to the sides, while the remaining four walls (bottom, ceiling, front and rear wall) are closed. At the external sides of the front wall 20 and of the rear wall 21 of the load carrier 16, there are provided projecting extensions 22 which may be underengaged by a lifting element 23 that is supported at the frame 10. In the illustrated embodiment, the lifting elements 23 are piston cylinder units which are mounted flexibly between the two front supports 13 and between the two rear supports 15.

The lifting elements 23 extending substantially vertically underengage the extensions 22 to lift the load carrier 16 from the lowered position illustrated in FIG. 2 into the travel position according to FIG. 1. In this position, the load carrier 16 is underengaged by L-shaped locking elements 24 hinged at the frame 10 and which can be automatically latched when the load carrier 16 has reached its uppermost final position. As a result, the load carrier 16, when in a travelling position, is rigidly connected in the frame 10.

In the embodiment of FIGS. 4 and 5, the frame 10 is substantially of the same design as frame 10 of the first embodiment. However, in contradistinction thereto, it can be lowered in total relative to the axles 18 and 19, and, at the same time, as evident from FIG. 5, the driver's cab 12 and the motor 17 are lowered as well.

In this case, the front lifting element 30 is supported on the front axle 18, while the rear lifting element 31 is supported on the rear axle 19. The upper ends of both lifting elements 30 and 31 engage members which are firmly and rigidly connected to the frame 10.

The front support 13 and the rear support 15 have transverse slots 32 which extend nearly horizontally at the insides of the supports and are open to the vehicle sides. Into the slots, pins 33 projecting to the outside from the front walls of the load carrier 16 can be introduced. The transverse slots 32 have click-stop recesses for the pins 33 to be arrested when the load carrier 16 is mounted in the right position by a lateral displacement relative to the frame 10. By this means, the load carrier 10 is "suspended" in the frame by means of the pins 33, and when it is lifted from the lowered position shown in FIG. 5, the frame 16 is lifted at the same time.

In addition, (non-illustrated) locking elements can be provided to avoid oscillating movements of the load carrier during travel.

Figure 6:
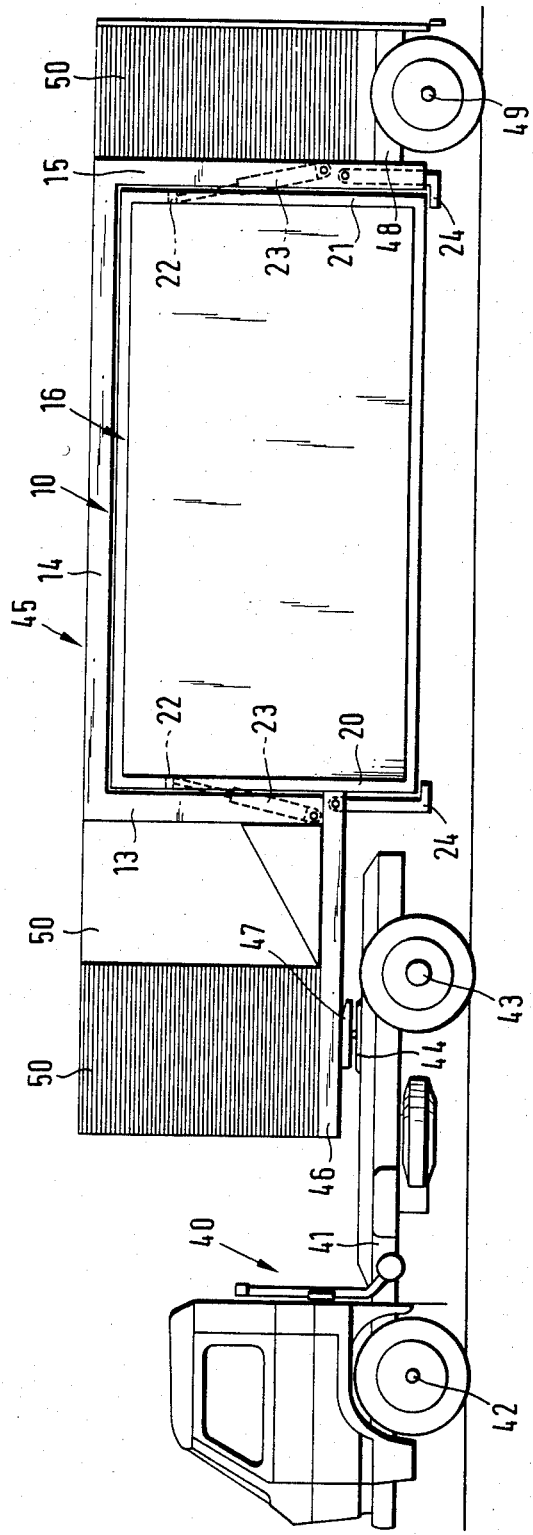
FIG. 6 is a schematic side view of another embodiment of the present invention showing a truck tractor having a semitrailer which is provided with a frame and with an exchangeable load carrier held by the frame.

In the embodiment according to FIG. 6, there is provided a truck tractor 40 of the conventional type having a frame 41 which rests on the front axle 42 and on the rear axle 43. At the frame 41, a pivot bearing 44 is mounted to receive the front end of the semitrailer 45. Basically, the semitrailer 45 is of the same design as the load carrier construction of the truck of FIGS. 1 to 3. To the portal-like frame 10, opened laterally and bridging the load carrier 16 in longitudinal direction of the vehicle, a horizontal beam 46 is secured which horizontally protrudes forwardly from the vertical support 13 of the frame 10. At the underside of the beam 46, the counter-support 47 for the pivot bearing 44 of the truck tractor 40 is fitted. The bearings 44 and 47 are intermeshing with a vertical link pin.

From the rear vertical support 15 of the frame 10, a horizontal beam 48 projects to the rear side. The rear axle 49 of the semitrailer 45 is suspended at said beam 48. The rear axle 49 is the sole axle of the semitrailer the front end of which is supported on the pivot bearing 44 of the truck tractor 40.

Just as in the embodiment of FIGS. 1 to 3, lifting elements 23 the free ends of which underengage the projecting extensions 22 of the load carrier 16 are supported at the frame 10 so as to lift and lower the load carrier inside the frame 10.

L-shaped locking elements 24 hinged at the frame 10 underengaging the load carrier 16 in lifted position serve to arrest the load carrier 16 in lifted position. Outside the frame 10 above the beams 46 and 48 of the semitrailer 45, free loading surfaces are available which are covered by box structures 50. Thus, outside the load carrier 16, additional loads or aggregates can be transported on the semitrailer within the box structures 50.

What is claimed is:

1. An over-the-road truck with an exchangeable load carrier comprising:

a load carrier having a front, rear, sides and projecting extensions for support thereof, the sides of said load carrier being parallel to the normal direction of movement of said truck, said sides being substantially completely open to facilitate access to the contents thereof;

a rigid frame having a cavity sized to accept said load carrier, said frame enclosing the front and rear of said load carrier but not enclosing the sides thereof and including at least one beam bridging said cavity;

front and rear axles having wheels mounted thereon and being mounted to said frame, said wheels mounted on said front axle being steerable while said rear wheels are non-steerable;

means supported by said frame and interacting with said projecting extensions for lifting and lowering said load carrier into and from a travel position within said cavity;

latch means attached to said frame for securely supporting and latching said load carrier in said frame when in the travel position independently from operation of said means for lifting;

a driver's cab positioned over said front axle;

a motor mounted behind the cavity in said frame and driving said rear axle; and control means interconnecting said driver's cab and motor for controlling said motor;

said load carrier having rollers provided on the underside thereof to facilitate removal of said load carrier from said cavity by rolling said carrier transversely to the normal direction of movement of said truck.

2. The truck of claim 1, wherein said latch means are hinged L-shaped elements which pivot under said carrier to thereby support it.

3. The truck of claim 1, wherein said means for lifting and lowering comprises at least two lifting elements.

* * * * *